United States Patent [19]

Nishikawa et al.

[11] Patent Number: 4,926,958
[45] Date of Patent: May 22, 1990

[54] GUIDE DEVICE FOR AUTOMATED GUIDED VEHICLE

[75] Inventors: Shoji Nishikawa, Nagoya; Akira Ohkura; Katsuya Ichida, both of Toyota, all of Japan

[73] Assignee: Toyota Jidosha Kabushiki Kaisha, Toyota, Japan

[21] Appl. No.: 200,975

[22] Filed: Jun. 1, 1988

[30] Foreign Application Priority Data

Jun. 4, 1987 [JP] Japan ................................. 62-87128
Jun. 10, 1987 [JP] Japan ................................. 62-89550

[51] Int. Cl.$^5$ ............................................. B62D 1/02
[52] U.S. Cl. ..................................... 180/168; 180/157
[58] Field of Search ............... 180/131, 168, 55, 156, 180/157, 167; 104/242, 247; 318/587

[56] References Cited

U.S. PATENT DOCUMENTS

| | | | |
|---|---|---|---|
| 4,040,527 | 8/1977 | Krieg | 180/168 X |
| 4,078,630 | 3/1978 | Krieg | 180/168 |
| 4,454,819 | 6/1984 | Cuylits et al. | 104/242 X |
| 4,652,004 | 3/1987 | Wirth et al. | 180/168 |

FOREIGN PATENT DOCUMENTS 2531057 1/1977 Fed. Rep. of Germany ...... 180/168

0057311 4/1982 Japan ................................. 318/587

*Primary Examiner*—Charles A. Marmor
*Assistant Examiner*—Brian S. Johnson
*Attorney, Agent, or Firm*—Finnegan, Henderson, Farabow, Garrett and Dunner

[57] ABSTRACT

A guide device for an A.G.V. in which a magnetic field generated around a guide cable is detected by a pair of detection coils at both sides of the guide cable, and wheels are steered and driven in accordance with the detected output from the detection coils. A pair of detection coils are arranged to follow the movement of the wheels to be steered in such a manner that the detection coils are disposed away from each other at a predetermined distance from the guide cable when the A.G.V. runs a straight portion of a course, while the detection coils are positioned closer to the guide cable when the A.G.V. runs a curved portion. As a result, when the A.G.V. runs the straight portion, the sensitivity with respect to the deviation between the detection coils is kept low so that the carrier can run smoothly, when the A.G.V. runs a curved portion, the sensitivity with respect to the deviation between the detection coils is increased. Consequently, operating performance such as high speed operating performance and the minimum turning diameter can be improved.

9 Claims, 7 Drawing Sheets

GUIDE DEVICE FOR AUTOMATED GUIDED VEHICLE

BACKGROUND OF THE INVENTION

This invention relates to a guide device an automated guided vehicle (hereinafter A.G.V.) which detects a magnetic field generated around a guide cable for automatically controlling the operation of the A.G.V. in accordance with the output of the detected field.

DESCRIPTION OF THE PRIOR ART

An A.G.V. is known which is operated in an automated guided manner by passing AC current through a guide cable arranged on the surface of a running road for the purpose of generating a magnetic field around the guide cable. The thus-generated magnetic field is detected by the detection coils and the turning and driving wheels are steered along the guide cable in accordance with the corresponding output of the detected field.

In a guide device for an A.G.V. of the type described above, the detection coils for detecting a magnetic field are installed: for example, as shown in FIG. 16, wherein a pair of detection coils 3a and 3b are fitted to a retaining plate 2, which in turn is secured to a front wheel portion 1, of the A.G.V. The coils 3a and 3b are disposed symmetrically on both sides of the front wheel 4 so that the detection coils 3a and 3b are turned together with the front wheel 4 when steering is performed. Another type of known A.G.V. is in FIG. 17, wherein arms in the form of a triangular frame 12 is fitted to the front portion of a car body 11. The triangular frame 12 projects over the front portion of the car body 11, and is arranged to be turned horizontally in accordance with steering operation. Each of a pair of the detection coils 13a and 13b are disposed respectively at two sides of the front end of the triangular frame 12.

However, in the case of a rear-wheel steering forklift, its steering mechanism portion is not provided with the steering-arm in the form of a triangular frame nor a steering shaft as provided in an automated guided three-wheel vehicle. Therefore, a structure cannot be employed in which the triangular steering-frame and the steering shaft are utilized for the purpose of making the detection coils follow the wheels which are being steered.

Meanwhile, the output voltage detected by the detection coil involves a characteristic that is changed in accordance with the distance between the detection coils and the guide cable. The level of the output voltage becomes higher as the two components move closer. The change in the output voltage becomes greater (a sensitivity with respect to the deviation is high) due to a slight change in the distance when the two components are disposed closer together. When the two components are disposed farther from each other, the change in the output voltage is small for a corresponding change in the distance.

Since the detection coil has the characteristic described above, it is preferable to keep the sensitivity with respect to the deviation at a low level in order to prevent the A.G.V. from preforming a meaningless movement (zigzagging) when the A.G.V. runs along straight portion of the guide cable, that is, when no wheel is turned. On the other hand, it is preferable to raise the sensitivity with respect to the deviation in order to prevent occurrence of a derailment when the A.G.V. runs along a curved portion of the guide cable, that is, when the wheel is turned.

However, in the above-described conventional guide devices for an A.G.V., the distance between a pair of the detections coils 3a and 3b and the distance between the detection coils 13a and 13b are fixed, respectively. Therefore, the distance between the guide cable and the detection coils is always constant when the A.G.V. either runs along a straight portion of the course or a curved portion of the course.

As a result, since the sensitivity with respect to the deviation is at the same level when the A.G.V. runs a straight portion of the course, as a curved portion of the course, a slight deviation in the running direction causes a great degree of turning of the wheels. This causes zigzagging or derailment on the straight portion of the course, as the case may be, if the sensitivity with respect to the deviation is raised in order to properly run the curved portion. Therefore, if a design is employed so as to make the A.G.V. run smoothly along the straight portion as well the curved portion, the running speed cannot be raised in the straight portion. Thus, this causes a problem with respect to the carrying efficiency of the A.G.V.

As shown in FIG. 18, the present inventor developed a guide device for an A.G.V. wherein the detection coils are movable in order to obtain a high sensitivity with respect to the deviation when the A.G.V. runs along curved portions of the course.

This device is constituted in such a manner that two links 23a and 23b are provided for an A.G.V. 21. The two links 23a and 23b are moved by a wheel 22 that is turned to maintain a parallel relationship between the two links 23a and 23b. A pair of detection coils 24a and 24b are provided for the two links 23a and 23b, When the A.G.V. 21 enters a curved portion, the distance between the detection coils 24a and 24b and a guide cable G is changed. The wheel 22 to be steered is turned to modify this change, and the A.G.V. 21 runs along the guide cable G. In this state, a pair of the links 23a and 23b is turned in the same direction as the wheels 22 in synchronization with the wheel 22, and the parallel relationship between the links 23a and 23b is retained. The detection coils 24a and 24b are moved closer until each one is positioned at a distance l from the guide cable G. As a result of this, the detection coils 24a and 24b improve their sensitivity with respect to the deviation in the curved portion. Thus, the A.G.V. can run along the curved portion without derailment occurring because of the guide cable.

Although the distance between the pair of the detection coils 24a and 24b and the guide cable G is shortened in the curved portion as described in connection with FIG. 18 above, shortening is not significant, and therefore the sensitivity with respect to the deviation is not sufficient in the curved portion. Therefore, the A.G.V. cannot travel over the curved portion at a sufficiently high speed.

SUMMARY OF THE INVENTION

An object of the present invention is to provide a guide device for an A.G.V. which can enable the A.G.V. to travel at a high speed along a straight portion as well as along a curved portion of a course.

A guide device for an A.G.V. according to the present invention which guides an A.G.V. along a guide cable by detecting the magnetic field generated around the guide cable by means of a pair of detection coils disposed on opposite sides of the guide cable. An actuator is operated in accordance with the detected outputs from the detection coils; and the steering and driving wheels are steered by a steering link mechanism operated by the actuator. The guide device for an A.G.V. comprises: a pair of detection coils movably disposed for the purpose of following the movement of the wheels to be steered. The pair of detection coils are positioned spaced from the guide cable at a predetermined distance when the A.G.V. travels a straight portion of the course; and when the A.G.V. travels a curved portion of the course, the pair of detection coils are positioned closer to the guide cable.

The pair of detection coils are supported by the tie-rod or the knuckle arm of the steering link mechanism, so that the detection coils can follow the steering movement of the wheels.

Furthermore, the detection coils follow the steering movement of the wheels by providing a pair of movable detection coils at a position in front of the wheels to be steered in the direction of travel along the guide rail, and connecting the detection coils and the steering link mechanism by a connecting member disposed in the widthwise direction of the car body.

As described above, since the detection coils are disposed away from each other at a certain distance from the guide cable in accordance with the steering movement of the wheel; when the A.G.V. travels along a straight portion of the course, the sensitivity of deviation is prevented from significantly increasing. As a result, zigzag operation is prevented, and the A.G.V. can run smoothly.

Furthermore, with a pair of detection coils which follow the steering movement of the wheel when the A.G.V. travels a curved portion of the course, and the sensitivity of deviation increases; deviation can be properly modified in a short time when the A.G.V. travels the curved portion, and the operating performance such as high speed running, or the minimum turning diameter can be improved in an automatic operation mode. As a result, the time required to travel a certain course distance can be significantly shortened, and the A.G.V. has the capability of clearing a small-radius corner, and thereby reducing the pathway space for the A.G.V.

DETAILED DESCRIPTION OF THE INVENTION

Figure 1:
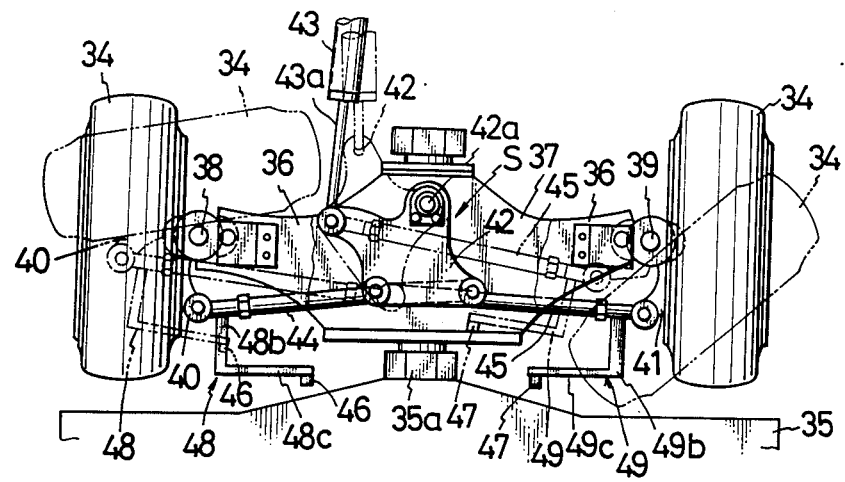
FIG. 1 is a plan view of a steering link mechanism incorporating a first embodiment of the present invention.

The present invention will now be described with reference to the accompanying drawings.

FIGS. 1 to 5 illustrate a guide device for an A.G.V. with a forklift according to a first embodiment of the present invention. A forklift 30 having a body 31 is provided with fork 33 which is elevationally provided in such a manner that the fork 33 can be inclined in front of front wheels 32 in the front portion (left of FIGS. 4 and 5) of a body 31. In the rear portion of the body 31, rear wheels 34 which are the wheels to be turned, are provided. Behind the rear wheels 34, a counter weight 35 is connected with a connecting portion 35a. Above the body 31, a drivers seat 31a and a steering wheel 31b are provided.

The steerable rear wheels 34 are fitted to opposite ends of an overbeam 36 and an underbeam 37, which are fitted to form two joints with knuckle arms 40 and 41, which are movably fitted to knuckle arms 38 and 39. The wheels 34 are fitted in such a manner that they can be turned.

Figure 3:
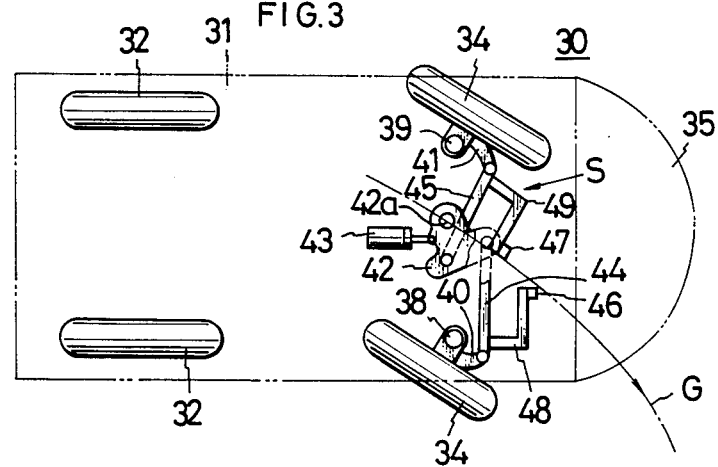
FIG. 3 is a schematic plan view illustrating the operation of the steering link mechanism and guide device of FIG. 1.
Figure 4:
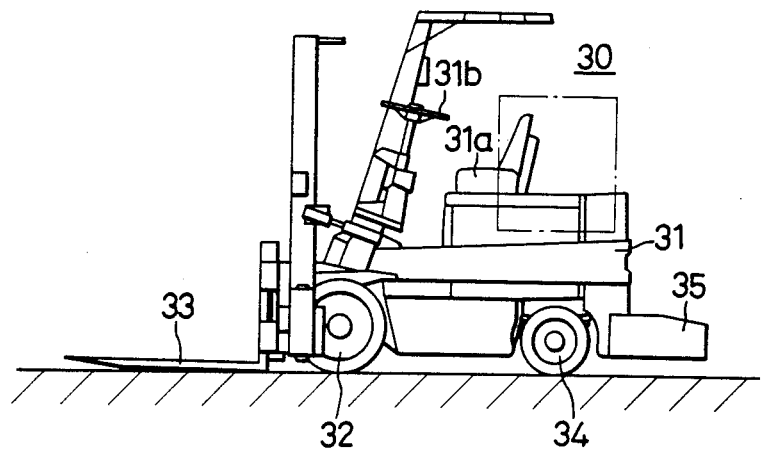
FIG. 4 is a side-elevational view of a forklift body incorporating the embodiment of FIG. 3.
Figure 5:
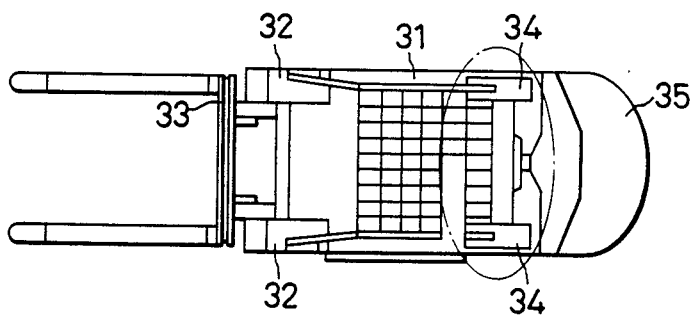
FIG. 5 is a plan view of the forklift truck of FIG. 4.

On the other hand, a steering link mechanism S for turning the rear wheels 34 comprises a bell-crank 42, a power-steering cylinder 43 for rotating the bell-crank 42, and tie-rods 44 and 45 for transferring the rotation of the bell-crank 42 to the knuckle arms 40 and 41. The bell-crank 42 is disposed in a space between the overbeam 36 and the underbeam 37; and is supported relative to a rotational shaft 42a (FIG. 1) which is disposed on the center line of the car body in such a manner that the bell-crank 42 can rotate horizontally. The front end of a rod 43a of the above-described power steering cylinder 43 is connected to the point at which force is applied of the bell-crank 42, while the above-described two tie-rods 44 and 45 are connected to the two points of application of the bell-crank 42 in such a manner that an end of the tie-rod 44 is connected to the top surface of the bell-crank 42, while an end of the another tie-rod 45 is connected to the lower side of the bell-crank 42, each of the tie-rods 44 and 45 being rotatably connected such that the tie rod rotatable end connection to the bell crank provides for revolving in an arc about the bell crank vertical axis as shown in FIG. 3. A rod end at each end of the two tie-rods 44 and 45 is rotatably connected to the end of the corresponding knuckle arms 40 and 41.

Detection coils 46 and 47 are fitted to the above-described tie-rods 44 and 45 with stays 48 and 49 whose base portions are connected to the place adjacent to rod ends of the tie-rods 44 and 45. The two stays 48 and 49 are constituted by members 48a and 49a whose top ends are connected to the tie-rods, the members 48a and 49a projecting downwardly. Furthermore, the two stays 48 and 49 are constituted by members 48b and 49b extending rearwardly over the lower ends of the members 48a and 49a and members 48c and 49c extending toward the center line of the car body over rear end of the members 48b and 49b. The detection coils 46 and 47 are fitted to the front end of the members 48c and 49c which extend toward the center line of the car body. The detection coils 46 and 47 are disposed below the underbeam 37, which is disposed at the lowermost position of the car body. The detection coils 46 and 47 are each positioned at the same distance from the center line of the car body, and at the same height from the road surface. Furthermore, the two detection coils 46 and 47 are each disposed adjacent the road surface on which a guide cable G is arranged. Furthermore, the two detection coils 46 and 47 are disposed such that any parts of the car body which are of a magnetic substance are not interposed between the two detection coils 46 and 47 and the road surface for the purpose of reducing the external attraction. Furthermore, the two detection coils 46 and 47 are disposed such that when the wheels are turned, they do not interfere with the overbeam 36, underbeam 37, bell-crank 42, counter-weight 35 and portion 35a of the counter-weight 35 which is connected to the car body.

The operation of the first embodiment whose structure has been described above will now be described.

When the forklift 30 transports a cargo mounted on the fork 33 thereof, the forklift 30 runs in reverse making the rear wheels 34 thereof, the front portion in the direction of travel. The magnetic field generated by the guide cable G, which is arranged on the road surface, is detected by detection coils 46 and 47. The steering is to performed that the detected outputs from the two detection coils 46 and 47, become the same with the travelling direction automatically modified, as a result of which, the forklift 30 runs along the guide cable G in an automated guided manner.

Figure 2:
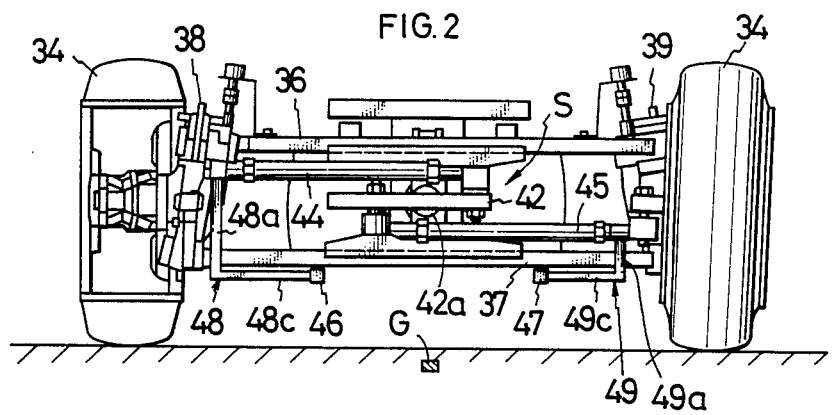
FIG. 2 is a rear view of FIG. 1.

When the forklift 30 runs along a straight portion in accordance with the guide by the guide cable G, the two detection coils 46 and 47 are positioned away from the guide cable G at a proper distance. The two detection coils 46 and 47 are fitted to the stays 48 and 49, whose bases in turn are supported at the positions adjacent each rod end of the tie-rods 44 and 45 of the steering link mechanism S. As a result, the sensitivity of deviation is kept at a certain low level, whereby zigzagging due to the detection of slight deviations caused from exceedingly high sensitivity, is prevented (FIG. 2).

When the forklift 30, for example, enters the right corner, the difference between the outputs from the two detection coils 46 and 47 becomes great. Therefore, the existence of the right corner of the guide cable G is detected, and the power steering cylinder 43 is operated by a degree corresponding to the curvature of the guide cable G, whereby the bell-crank 42 of the steering link mechanism S is rotated a predetermined number of degrees. When the bell-crank 42 is rotated, the right and left wheels 34, are turned by a predetermined angular extent by the tie-rods 44 and 45. One end of each tie-rod is connected to bell-crank 42, and the rod ends of each of the tie-rods 44 and 45 are connected to the knuckle arms 40 and 41 respectively.

As a result of the turning of the right and left wheels 34, the forklift 30 rungs along the guide cable G in the curved direction. In this state, because two rear wheels 34 are turned by a predetermined steering angle, the two tie-rods 44 and 45 are both moved toward the bent or curved portion of the guide cable G. As a result, the detection coils 46 and 47, which are supported by the two tie-rods 44 and 45 via the stays 48 and 49, are also moved in the same direction; and they are disposed at a closer position above the guide cable G (see FIG. 3).

Therefore, when the forklift 30-runs along curved portions, the rear wheels 34, which are the running wheels, are turned, and simultaneously the positions of the two detection coils 46 and 47 are moved in a direction closer to one another. Therefore the sensitivity of the detection coils 46 and 47 increases with respect to the deviation. As a result, the modification of the deviation in the curved portion can be properly performed in a short time, whereby the operating performance, such as high-speed running performance, and the minimum turning diameter in an automated guided mode when the forklift 30 runs the curved portion, is improved.

Figure 6:
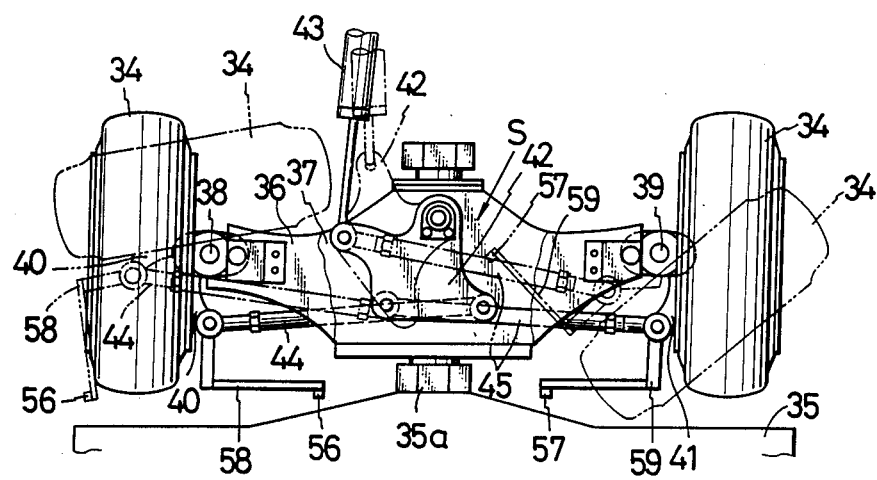
FIG. 6 is a plan view of steering link mechanism for a steerable wheel incorporating a second embodiment of the present invention.
Figure 7:
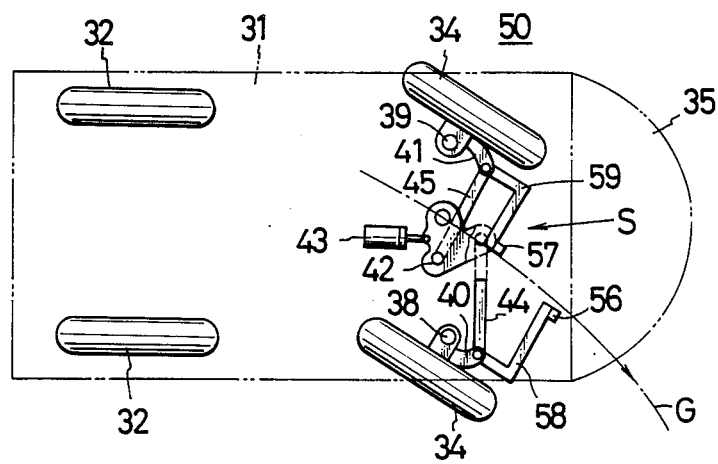
FIG. 7 is a schematic plan view illustrating the operation of the steering link mechanism and guide device of FIG. 6.

FIGS. 6 and 7 illustrate a second embodiment of the present invention. In the second embodiment, the detection coils, instead of being supported by the tie-rods and the stays in the first embodiment, are supported by the knuckle arms of the steering link mechanism. The same components as those used in the first embodiment are given the same reference numerals, and the detailed description of such components is omitted.

By detecting the magnetic field generated by the guide cable G, detection coils 56 and 57 of the guide device for operating a forklift 50 in an automated guided manner are fitted to ends of knuckle arms 40 and 41 of the steering link mechanism S with stays 58 and 59, respectively. The detection coils 56 and 57 are disposed below an underbeam 37, and when the forklift 50 runs the straight portion, they are disposed at the same distance from the center of the car body and at the same height from the road surface. Therefore, the two detection coils 56 and 57 are disposed closer to the road surface on which the guide cable G is arranged. Furthermore, the detection coils 56 and 57 are disposed in such a manner that any parts of the car body, which are of magnetic material, are not interposed between the two detection coils 56 and 57 and the road surface, thereby reducing external influence. Furthermore, an arrangement is employed wherein the turning of a wheel does not cause the two detection coils 56 and 57 to interfere with the overbeam 36, underbeam 37, bell-crank 42, counter-weight 35, and the portion 35a for fitting the counter-weight 35 to the car body.

When the thus-constituted forklift 50 transports a cargo mounted on the fork 33 thereof, the forklift 50 runs in reverse making the rear wheels 34 the front portion of the running. The magnetic field generated by the guide cable G which is arranged on the road surface is detected by a pair of the detection coils 56 and 57. The wheels are so steered that the detected outputs from the two detection coils 56 and 57 become the same as the other, whereby the forklift 50 runs in an automated guided manner along the guide cable G with its running direction automatically modified When this forklift 50 running in an automated guided manner reaches, for example, the right corner, the existence of the right corner is detected from the difference between the detected outputs from the two detection coils 56 and 57. As a result, the bell-crank 42 is rotated angularly to an extent corresponding to the curvature of the guide cable G, by the power steering cylinder 43. Therefore, the tie-rods 44 and 45 which are connected at one end to the bell-crank 42 turn the right and left wheels 34 a predetermined angle by the knuckle arms 40 and 41. As a result, the forklift 50 runs along the guide cable G in the curved portion of the course. In this state, when the two rear wheels 34 are turned by a predetermined steering angle, the knuckle arms 40 and 41 are rotated with the two rear wheels 34. As a result, the detection coils 56 and 57, which are provided for each of the knuckle arms 40 and 41 are rotated with the stays 58 and 59 and follow the movement of the rear wheels 34; whereby the detection coils 56 and 57 are moved closer to each other at the position above the guide cable G (see FIG. 7).

Therefore, when the forklift 50 runs along the curved portion, the rear running wheels 34 are turned; and simultaneously, the position of the detection coils 56 and 57 are moved closer to the guide cable G. As a result, the sensitivity with respect to the detected output increases, whereby the modification of the deviation at the curved portion can be properly carried out in a short time. Consequently, the operating performance, such as high speed operation and minimum turning diameter can be improved when running curved portions in an automated guided manner.

FIGS. 8 to 12 illustrate a third embodiment of the present invention. The same components as those in the first embodiment are given the same reference numerals, and the detailed description of them are omitted.

A guide rail 60 having C-shaped cross section with a slit 60a in the longitudinal direction on the bottom surface thereof is fitted behind the rear wheels 34 in such a manner that the central portion thereof is, horizontally in the widthwise direction of the car body, supported at the connecting portion 35a of the counter-weight 35 which is disposed behind the two rear wheels 34. A pair of movable detection coils 61 which are connected at a predetermined distance from each other by a bar-shaped connecting member 61a, are provided for the guide rail 60. The detection coils 61 are provided such that they can move in the widthwise direction of the car body. In this state, the detection coils 61 are respectively suspended by sliders 62 which fit in the longitudinal slit 60a. The sliders 62 are T-shape in cross-section, and rollers 62a which are fitted to two lateral ends of the T-shaped sliders 62 are fitted in the guide rail 60 in such a manner that the rollers 62a can be rolled in the guide rail 60. The detection coils 61 are fitted to the lower end of a vertical bar which extends downwardly from the slit 60a (see FIGS. 10 and 11).

One end of a coil spring 63 is connected to one end of the guide rail 60 and the other end is connected to one of the detection coils 61 (right of FIG. 9) of the pair of detection coils, which are connected to each other by bar or connecting member 61a. As a result, each detection coil 61 is always urged elastically in the returning direction (right direction of FIG. 9). Also, a first end of a towing cable 64 is connected to the other (left of FIG. 9) detection coil 61, and the opposite or second end is connected to bell-crank 42. Towing cable 64 is wound around a first pulley 65 fitted to said other end of the guide rail 60, and around a second pulley supported to the underbeam 37 adjacent to the center line of the car body. The second end of the towing cable 64 is connected to the point at which force is applied of the bell-crank 42 by rod 43a of the power steering cylinder 43.

Figure 8:
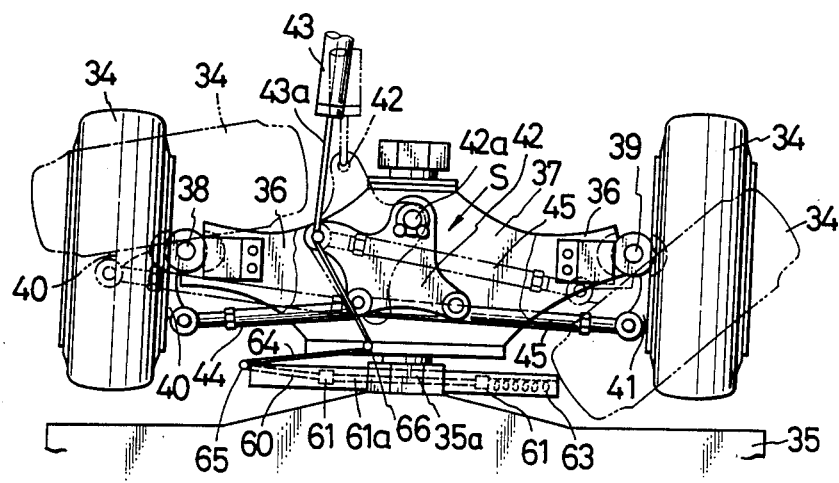
FIG. 8 is a plan view of a steering link mechanism incorporating a third embodiment of the present invention.
Figure 9:
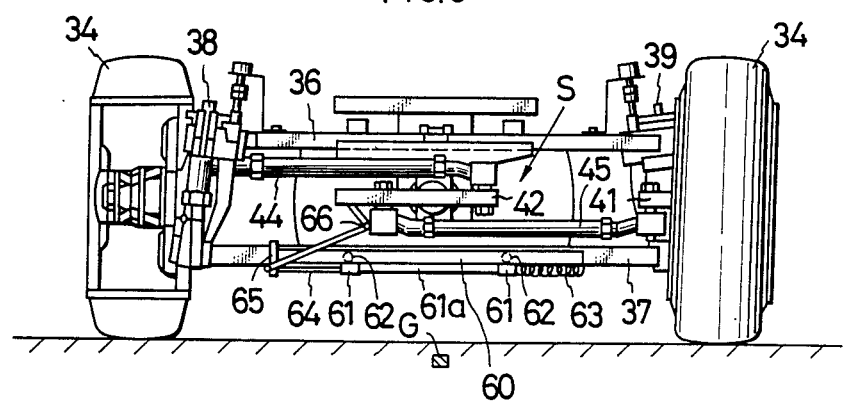
FIG. 9 is a rear view of the mechanism in FIG. 8.
Figure 10:
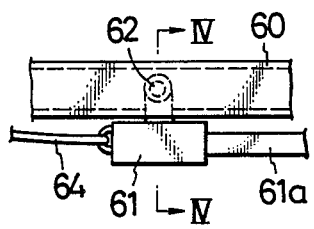
FIG. 10 is an enlarged fragmentary view illustrating the attachment of the detection coils of FIG. 8.
Figure 11:
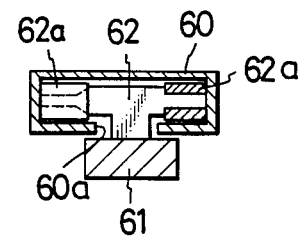
FIG. 11 is a cross-sectional view taken along the line IV—IV of FIG. 10.
Figure 12:
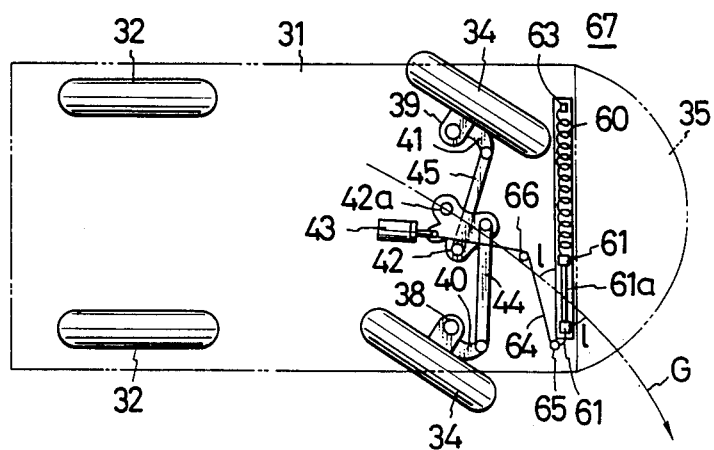
FIG. 12 is a schematic plan view illustrating the operation of the steering link mechanism and guide device of FIG. 8.

The length of the towing cable 64 is determined such that the two detection coils 61 are disposed at the same distance from the center line of the car body when the rear wheels 34 are positioned to run a straight portion of the course. For example, when the rear wheels 34 are turned, the bell-crank 42 is, as shown in FIG. 8, rotated clockwise, causing the towing cable 64 to be pulled. As a result of this, the two detection coils 61 are moved in slit 60a of guide rail 60 leftwardly as shown in FIG. 9 against the urging force of coil spring 63. When the bell-crank 42 is, as shown in FIG. 8, rotated counter-clockwise by the power steering cylinder 43, the guide cable 64 is slackened permitting the two detection coils 61 to be pulled by the elastic force of the coil spring 63; and simultaneously the two detection coils 61 move rightwardly, as shown in FIG. 9 along slit 60a of guide rail 60. The two detection coils 61 are disposed in such a manner that they do not interfere with the overbeam 36, underbeam 37, bell-crank 42, counter-weight 35 to the portion 35a for fitting of the counter-weight 35 to the car body.

The operation of the third embodiment whose structure has been described above will now be described.

When the forklift 67 transports a cargo mounted on the fork 33 thereof, the forklift 67 runs in a reverse direction making the rear wheels 34 the front portion of the running gear. The magnetic field generated by the guide cable G disposed on the road surface is detected by pair of the detection coils 61. The wheels are so steered that the outputs detected by the two detection coils 61 become equal to each other. As a result, with the running direction automatically modified, the forklift 67 runs in an automated guided manner along the guide cable G.

When, for example, the forklift 67 enters a right corner, the difference between the detected outputs from the two detection coils 61 becomes greater, whereby the existence of the right curve of the guide cable G is detected. The power steering cylinder 43 is operated by a degree which corresponds to the curvature of the guide cable G, and the bell-crank 42 of the steering link mechanism S is rotated angularly a predetermined extent. When the bell-crank 42 is thus rotated, the right and left wheels 34 are turned a predetermined angular extent by means of the tie-rods 44 and 45. One end of each of the rods 44 and 45 is connected to the bell-crank 42 and the rod ends of the tie-rods 44 and 45 are connected to the knuckle arms 40 and 41.

As a result of the turning of the two rear wheels 34, the forklift 67 runs along the curved portion of the guide cable G. In this state, when the two rear wheels 34 are turned a predetermined steering angular extent, the detection coils 61 are simultaneously pulled by the towing cable 64 the second end of which is connected to the point at which force is applied of the bell-crank 42 by the power steering cylinder 43, and are moved toward the arc of the curved portion of the guide cable G. As a result, the distance l between the detection coils 61 and the guide cable G is decreased (see FIG. 12). In this embodiment, since the two detection coils 61 are moved linearly in such a manner that the two detection coils 61 are hung from the lower surface of the guide rail 60, the position of the guide rail 60 can be relatively freely selected; limited only by the fact that the space below the guide rail 60 is free from interference or a magnetic material. As a result of this, the two detection coils 61 can be disposed at the most suitable position with respect to height and other miscellaneous factors.

Therefore, when the forklift 67 runs along the curved portion, the rear running wheels 34 are turned; and simultaneously, the two detection coils 61 are moved closer to the guide cable G without interference with the car body. The magnetic field generated by the guide cable G can be detected under the most suitable conditions. Furthermore, since the two detection coils 61 are moved closer to the guide cable G, the sensitivity with respect to the deviation is made high. As a result, the modification of the deviation, when traveling over the curved portion can be properly carried out in a short time. Consequently, the operating performance for automated guided operation at the curved portion, such as high-speed running performance and minimum turning diameter, can be improved.

Figure 13:
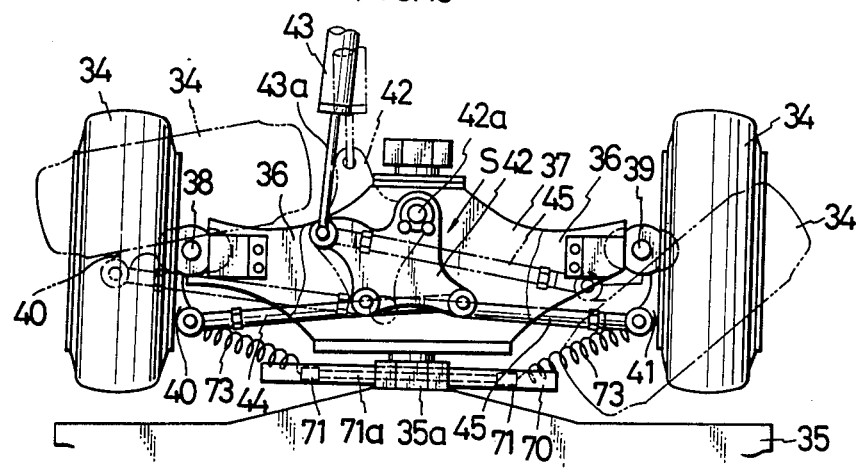
FIG. 13 is a plan view of a steering link mechanism incorporating a fourth embodiment of the present invention.
Figure 14:
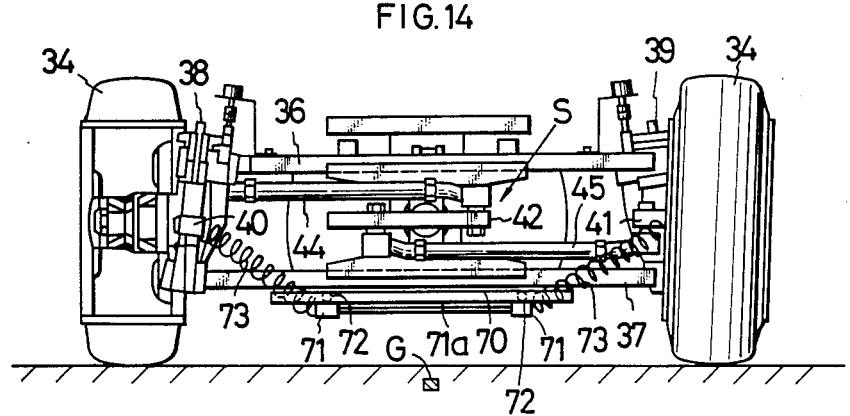
FIG. 14 is a rear view of the mechanism of FIG. 13.
Figure 15:
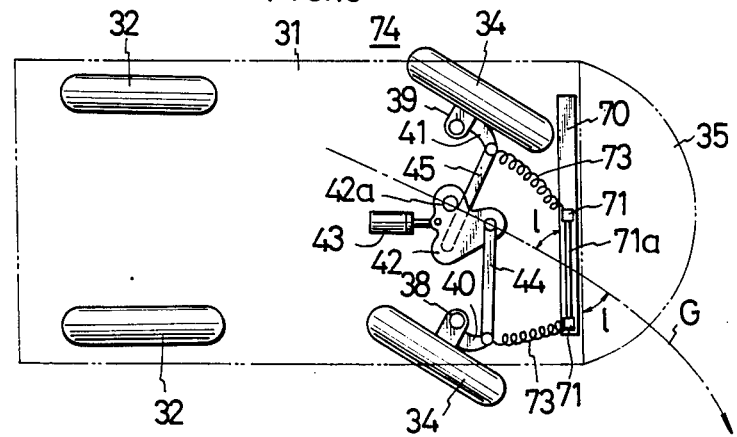
FIG. 15 is a schematic plan view illustrating the operation of the steering link mechanism and guide device of FIG. 13.
Figure 16:
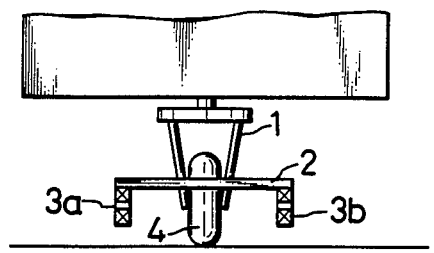
FIGS. 16 to 18 illustrate conventional example of guide devices for A.G.V.'s.
Figure 17:
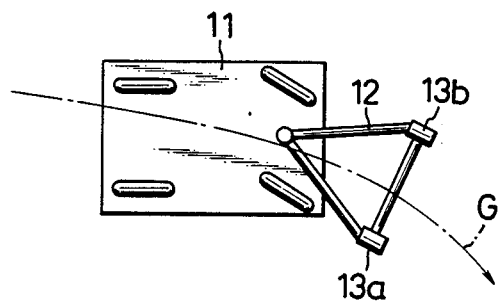
Figure 18:
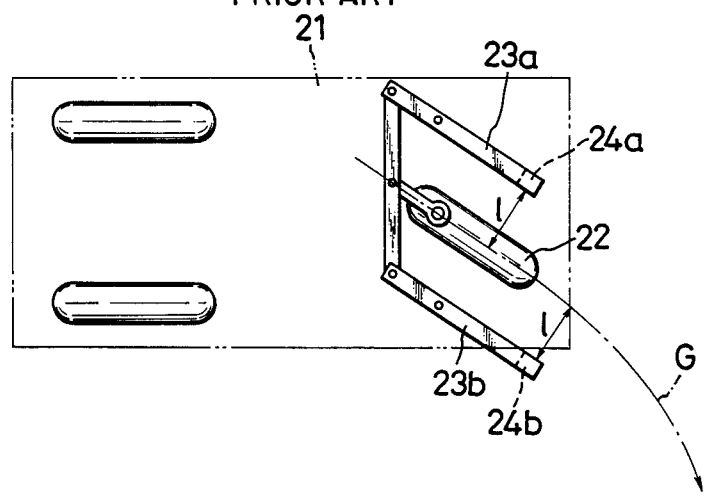

FIGS. 13 to 15 illustrate a fourth embodiment of the present invention, in which two coils springs, each having one end fastened to the knuckle arm, are used as a connecting member, as an alternative to the one towing cable having one end secured to the bell-crank as in the third embodiment. The same components as those used in the first embodiment are given the same reference numerals, and the description for them is omitted.

Two detection coils 71 of the guide device for operating a forklift 74 by detecting the magnetic field generated by the guide cable G are integrally connected at a predetermined distance by a bar-spaced connecting member 71a. The detection coils 71 are fitted to a guide rail 70 which is horizontally fitted in the widthwise direction of the car body to the connecting portion 35a which is disposed behind the rear wheels 34. The detection coils 71 being hung from sliders 72 in such a manner that they can freely move in the widthwise direction of the car body.

One ends of the coil springs 73 ends are fastened to the knuckle arms 40 and 41, and the other ends are connected to a corresponding one pair of detection coils 71, which coils are connected to each other by connecting member 71a.

When the forklift 74 whose structure has been described above transports a cargo mounted on the fork 33 thereof, the forklift 74 runs in reverse making the rear wheels 34 the front portion of running gear. By detecting the magnetic field generated by the guide cable G disposed on the road surface by means of a pair of detection coils 71, the steering is so performed that the outputs detected by the two detection coils 71 become equal to each other, thus, the forklift 74 runs in an automated guided manner along the guide cable G with the running direction automatically modified.

When the forklift 74 running in an automated guided manner reaches, for example, the right curve portion, the existence of the right curve is detected using the difference between outputs from the two detection coils 71. As a result of this, the bell-crank 42 is rotated by a degree corresponding to the curvature of the guide cable G by means of the power steering cylinder 43. As a result, the right and left rear wheels 34 are turned angularly a predetermined extent by means of tie-rods 44 and 45 the opposite ends of which are connected to bell-crank 42 and knuckle arms 40 and 41 respectively. Consequently, the forklift 74 runs along the guide cable G in the curved portion. In this state, when the two rear wheels 34 are turned by a predetermined steering angle, the knuckle arms 40 and 41 are rotated with two rear wheels 34. As a result, the detection coils 71 are elastically pulled in the steering direction by coil springs 73 each having one end fastened to respective knuckle arms 40 and 41, and are moved toward the arc of the guide cable G. The movement of the detection coils 71 follow the turning of rear wheels 34 in such a manner that the detection coils 71 are hung from the guide rail 70 (see FIG. 15).

Therefore, when the forklift 74 runs along the curved portion, the rear running wheels 34 are turned, and simultaneously, the two detection coils 71 are moved closer to the guide cable G. Therefore, the distance l between each detection coil 71 and the guide cable G is shortened, and the sensitivity with respect to the deviation in the detected output by the detection coils 71 becomes high. As a result of this, the modification of the deviation at the time of running the curved portion can be properly carried out in a short time. Consequently, the operating performance when the forklift 74 runs the curved portion in an automated guided manner, such as high speed running performance and the minimum turning diameter, can be improved.

In the above-described embodiments, although describing an embodiment used with a forklift having steerable rear wheels which is described, the present invention can be applied to a forklift of four wheel steering type, and can be applied to other types of A.G.V.'s which run in an automated guided manner.

What we claim is:

1. An apparatus for guiding an A.G.V. along a guide cable defining a straight and curved course, the A.G.V. having a pair of steerable wheels each mounted at opposite ends of a beam to pivot about a corresponding vertical axis, the beam extending perpendicular to the longitudinal center line of the A.G.V., the apparatus comprising:
   a steering linkage for each of the pivotable wheels including,
   a bell-crank mounted to the beam substantially equidistant from each wheel and pivotable on a vertical axis on the longitudinal center line;
   a knuckle arm connected to each wheel having an end offset from the vertical axis of the corresponding wheel,
   a tie-rod for each wheel having a first end pivotably connected to a corresponding knuckle arm and a second end pivotably connected to the bell-crank, the pivotable location of the second end of one of the tie-rods providing for revolving in an arc about the bell-crank axis in a direction toward the center line while the pivotable location of the second end of the other tie-rod provides for revolving in an arc about the bell-crank axis in a direction away from the center line at times when the wheels are turned to travel the curved course;
   a detecting coil for each steerable wheel for sensing the magnetic field surrounding the guide cable;
   means for connecting each detection coil to the steering linkage of a corresponding wheel effective to position the detecting coils spaced from the beam in a direction of the longitudinal center line a first predetermined equal distance on opposite sides of the longitudinal center line at times when the steering linkage positions the radial extent of the wheels parallel to the longitudinal center line for traveling the straight course;
   the connecting means being effective to shift both detection coils in a direction transverse the longitudinal center line while decreasing the distance between the detection coils and an extension of a line connecting the pivotal axis of the bell crank and the pivotal location of the second end of the tie-rod revolving in an arc toward the longitudinal center line at times when the steering linkage turns the wheels obliquely to the longitudinal center line for traveling the curved course.

2. The apparatus of claim 1 wherein the connecting means for each of the detecting coils comprises;
an assembly having a first portion attached at one end to the steering linkeage, and second portion extending downwardly from the first portion toward the roadway, and a third portion on which a respective detecting coil is mounted extending inwardly from the second portion toward the longitudinal center line.

3. The apparatus of claim 1 wherein the connecting means for each detecting coil fastens the respective detecting coil in a fixed position relative to the corresponding tie-rod irrespective of the steered position of the wheels.

4. The apparatus of claim 2 wherein each portion of the assembly is in a fixed position relative to a respective tie-rod and the third position of the assembly extends substantially parallel to the corresponding tie-rod.

5. The apparatus of claim 1 wherein the connecting means for each of the detecting coils comprises a mounting member having one end fixedly attached to and movable with the offset end of the corresponding knuckle arm and a second end positioning the detecting coil a fixed distance relative the corresponding wheel.

6. The apparatus of claim 5 wherein the mounting member positions the detecting coil a fixed distance from and substantially normal to the radial extent of the corresponding wheel.

7. The apparatus of claim 1 wherein the connecting means comprises a guide member having a longitudinal axis perpendicular to the longitudinal center line and the detecting coils are connected to move along the guide member axis upon the pivoting of the bell-crank.

8. The apparatus of claim 7 wherein the connecting means includes a cable connected to the detecting coils and to the bell-crank at a location offset from the vertical axis of the bell-crank for moving the detecting coils in one direction along the axis of the guide member and a spring urging the detecting coils in the other direction along the axes of the guide member.

9. The apparatus of claim 7 wherein the connecting means includes a spring connected at one end to each of the offset ends of the knuckle arms and at the other end to a respective detecting coil for moving the coils along the axis of the guide member.

* * * * *